Dec. 26, 1939.　　　　H. E. IVES　　　　2,184,525
ELECTROOPTICAL SCANNING APPARATUS
Original Filed May 24, 1933
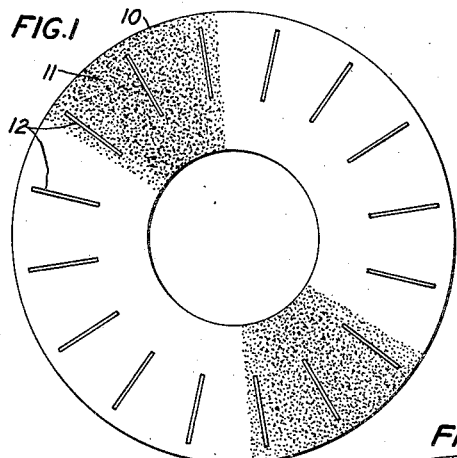
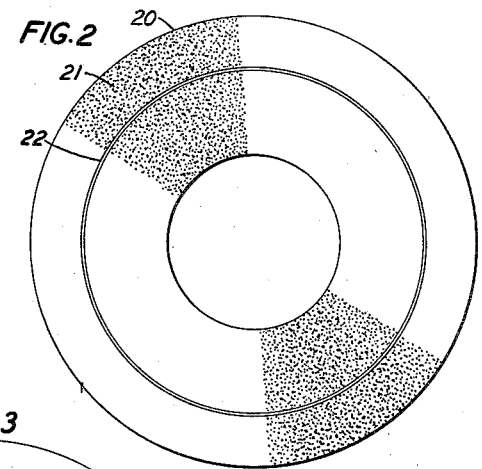
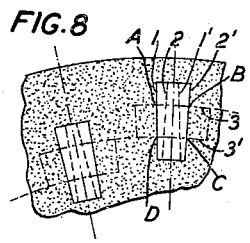
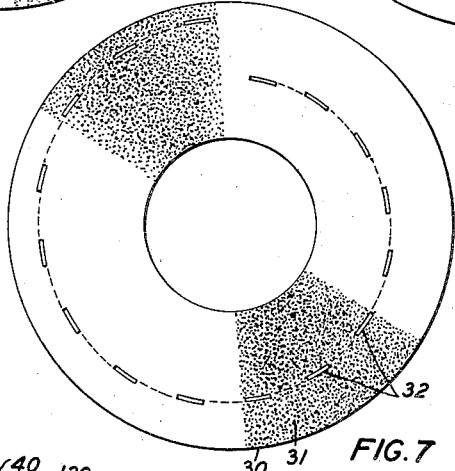
INVENTOR
H. E. IVES
BY
ATTORNEY Patented Dec. 26, 1939

2,184,525

UNITED STATES PATENT OFFICE 2,184,525

ELECTROOPTICAL SCANNING APPARATUS

Herbert E. Ives, Montclair, N. J., assignor to Bell Telephone Laboratories, Incorporated, New York, N. Y., a corporation of New York Continuation of application Serial No. 672,576, May 24, 1933. This application February 21, 1936, Serial No. 65,048

20 Claims. (Cl. 178—7.6)

This invention relates to electrooptical scanning and more particularly to scanning members for television and methods of constructing them.

An object of this invention is to provide improved and accurate means for scanning.

Another object is to provide a scanning member having optical apertures substantially without thickness.

Another object is to provide scanning means having optical apertures without physical opening, thus eliminating clogging of the apertures by dust or other foreign substances.

Another object is to provide an improved method of making the optical apertures by mechanical engraving operations.

It is also an object of this invention to provide an improved method of making the optical apertures by a photographic process from a master negative or negatives formed by the engraving process.

A further object is to provide a method of making optical apertured scanning members with apertures of such shape and so accurately positioned as to completely avoid either overlap or separation of the scanning lines.

The usual practice in making apertured scanning members is to drill or punch holes or slots in scanning discs or drums or belts of metal or other suitable material. By this method great difficulty has been experienced in securing satisfactory scanning members due to the difficulty of accurately locating the openings and where other than round openings are used the difficulties are increased. Where a single piece scanning member is employed, the holes have usually been round and in order to greatly reduce the appearance of dividing lines between the scanning strips developed when a scanning disc, drum or belt is in motion the holes have been made of such a size and so positioned as to provide overlapping of the scanning strips, thus partially eliminating the appearance of dividing lines or streaks. Notwithstanding this and because a uniform spacing of the holes has not been obtainable with the equipment usually available for manufacture, irregularities and streakiness appear in the television image. It has heretofore been suggested to make the apertures of a scanning disc rectangular and so positioned that the scanning paths will be contiguous. However, this results in slight overlap of the edges of the paths, with resulting streakiness of the image, since all elements of a straight line boundary of an aperture in a disc cannot travel in the same circular path. An additional cause of streakiness of the image produced by scanning apertured members has been the collection of dust particles in the apertures. Even with frequent cleaning of the apertures it has been found impossible in practice to completely avoid this difficulty.

In accordance with this invention any or all of the above-mentioned objections, as desired, may be overcome. The invention is a radical departure from the drilled open apertured scanning member. Various forms of the new scanning device are illustrated herein. It is illustrated in the form of a disc although the same principles are applicable to other scanning devices. In one form of the invention which has been found very satisfactory in practice, the scanning member is built up of two flat round transparent plates, such as glass. These plates are each given a thin opaque coating or film of paint or other suitable material. The opaque coating on one of them is engraved with transverse substantially radial lines and the other with longitudinal lines following a circle. These two plates are then mounted with their opaque coatings face to face resulting in a composite disc which is sealed against a stoppage, or partial stoppage, of the apertures by dust particles and in which the resulting optical apertures are clean cut and of such shape and so positioned that there is no overlapping or separation of adjacent scanning paths. Of course, if desired the engraving of one of the coatings may be along a spiral or chords instead of along circles about the center of the disc.

For this method to be successful the opaque coating must be thin and free from any tendency to tear or develop jagged edges along the cuts where it is removed. The cuts must be accurate. This is commercially practical with the best dividing engines. These requirements have been met for many years in the manufacture of half tone engraving screens and the same methods and technique as used in that art make it practicable to produce extremely accurate and satisfactory television scanning discs.

It has further been found that the advantages of the scanning disc constructed as described above may be retained and at the same time the cost of manufacture in quantity materially reduced if the discs are photographically constructed from a set of two master engraved plates. The two glass plates which are employed to form a scanning member from the master plates are coated with a very fine grained photographic emulsion instead of with the opaque paint as described above. The two master plates are so engraved as to be negatives, respectively, of the plates of the regular disc. They are made by engraving so as to outline the spaces or strips, which in the regular disc appear as openings in the opaque paint, and then removing all the paint from the plate except that forming the strips. The glass plates having the photographic emulsion are then placed in contact with the respective master plates, exposed to light and developed. Or, instead of using negative engraved plates, photographic negatives may be made from plates like those of the regular discs and these negatives used for contact printing of the emulsion on the glass plates. The photographic prints are then developed by a developing procedure which gives great density. For this purpose, resort may be had to what is called "physical development" in which silver is deposited on the surface of the film as long as the developing solution is allowed to act. Also, increase in contrast may be obtained by reducing with a proportional reducer.

An alternative construction arrangement employed to form the scanning member consists of a single transparent disc coated with an opaque ruled film on each of its two opposite faces; or, as a further modification, of a single transparent disc coated on one side only with two opaque films each of which has portions removed or made transparent to form lines so positioned as to overlap or cross and form optical apertures. In the arrangement where the coatings are on one side of the transparent disc either two photographic emulsions or a combination of a mechanically engraved coating and a photographic emulsion may be used. The double coatings may be successively applied and formed, one superimposed upon the other, and the first coating must be applied and completely formed before the second is applied and formed. Where one of the coatings is an opaque paint this is applied first and after being suitably engraved to form light transmitting line areas the photographic emulsion is applied, photographically printed by contact printing with a master negative, light for this purpose being directed preferably toward the negative from the side opposite the glass backing, and the emulsion then developed. Where two photographic emulsions are employed, one is first applied and processed, and then the second superimposed and processed, all so that the transparent line areas in the two cross. In the latter arrangement a waterproof transparent varnish is preferably applied between the two emulsions.

The above described methods of producing optical apertures on glass or other transparent material used in forming a scanning member are applicable not only to such members formed of glass discs or rings, but also to a composite construction in which metal discs with individual coated glass inserts are fixed in each aperture position and optical apertures formed thereon through thin coatings.

A description of the embodiments chosen for illustrating this invention in which reference is made to the accompanying drawing follows:

Fig. 1 is a face view of one of the elements used in making a two-plate scanning disc;

Fig. 2 is a face view of a second element used in making a two-plate scanning disc;

Fig. 3 is a face view of a modification of the second element;

Fig. 4 is a face view, in elevation, of the assembled two-plate scanning disc;

Fig. 5 is a cross-sectional view in side elevation of the assembled two-plate scanning disc;

Figs. 6 and 7 are fragmentary broken face and cross-sectional views, respectively, of a single-plate scanning disc with the markings on the opposite sides of the disc.

Figs. 8 to 11 diagrammatically illustrate different procedures which may be used in engraving aperture markings;

Figs. 12 and 13 are fragmentary broken face and cross-sectional views, respectively, of a single-plate scanning disc with the coatings and the markings therein on the same side of the disc; and Fig. 14 is a cross-sectional view in side elevation of a composite construction in which metal discs with individual coated and optically marked glass inserts are fixed in each aperture.

As above stated this scanning device is built up with either two adjacent transparent support elements, or in the alternative arrangement with one transparent support element, such as glass made opaque excepting for narrow strips involved in forming the optical apertures.

Figs. 1 and 2 and Figs. 1 and 3 show sets of these elements or plates ready to be assembled, the first set positioning the optical apertures in a circle and the second set in a spiral. Each plate is given a thin opaque coating or film of paint or other suitable material and subsequently processed, as described above. As shown in Fig. 1, the plate 10 carries the opaque coating 11 having the radial light transmitting rulings or markings 12. These markings have a width equal to the length of a scanning aperture and in addition to being properly angularly spaced are of such a length or are so positioned that they will at least extend across a line corresponding to that defining the radial position of the apertures of the assembled disc, the radial width of which line is that of an optical aperture, and pass through the actual position of the optical apertures. If the optical apertures are positioned in a circle, these radial lines may extend between two parallel circles positioned without the radial limits of the optical apertures. While if the optical apertures are positioned in a spiral, the radial markings may extend between two spirals paralleling and lying outside of the first mentioned spiral, or each radial marking may have a length greater than the total radial pitch of the first mentioned spiral as shown in Fig. 1. The finished radial markings may have their sides parallel to a respective radius of the disc or radial. If the latter, the apertures of the assembled disc will terminate on respective pairs of radii and their circumferential length will decrease as the center of the spiral is approached. The radial dimension and final position of the optical apertures is determined by superimposing upon the plates shown in Fig. 1 a second plate such as is shown in Fig. 2 or 3, the coated faces preferably being placed in contact with each other. Fig. 2 shows a transparent plate 20 covered with a thin opaque film 21, a part of which is made transparent along a circular path 22. The width of this circular marking is equal to the radial dimension of the optical apertures. Fig. 3 shows a transparent plate 30 covered with a thin opaque coating 31, parts 32 of which are made transparent and are spirally positioned on the disc. The plates or discs shown in Figs. 1, 2 and 3 are similar except for the arrangement of the transparent markings in the opaque film material. The radial dimension of the spirally positioned markings 32 may be uniform or become less and less as the radius of the spiral decreases. Since only small sectors of a complete spiral are effective in forming the optical apertures the light transmitting portion may or may not be a continuous spiral. It is very desirable to have the finished apertures so positioned radially that the scanning lines are exactly juxtapositioned without any overlap or separation. It has been found that the accuracy which this requires, if the engraving process is to be used, can most practically be obtained by engraving at the proper angular position short circular lines. Of course, if this degree of accuracy is not desired, the engraving may be in straight lines normal to the radius passing through the center of each optical aperture or in a continuous spiral. Each succeeding line is formed by radially moving the engraving tool by such an amount that one of its edges is exactly contiguous to an edge of the preceding engraving and then the disc is rotated to the next aperture position to make a marking. By this operation the bottom edge of one marking and the top edge of another marking are either bounded by or are tangent to the same circle, depending upon whether the markings are circular or straight. The precision of the setting of the engraving tool may be increased by using a microscope in locating it. With this precision method the useful portions of the markings 32 are very accurately positioned in a spiral arrangement irrespectively of the exact width of the engraving tool. For example, if the tool is a few thousandths of an inch narrower than planned the only inaccuracy produced is a slight decrease of the total dimension of the field scanned and this is not discernible. On the other hand if the more natural procedure of causing the engraving tool to follow a continuous spiral is followed, the width of the tool must bear an exact relation to the radial change of the spiral and the angular positioning of the radial markings 12 in the associated disc with the result that a variation of a few thousandths of an inch in the width of the engraving tool (or variation in the other factors of the relationship above mentioned) will cause the apertures to produce either a marked overlap or a marked separation of the scanning lines. The above described improved method of engraving the useful portions of the aperture markings 32 therefore results in a greatly improved disc and is of real practical importance. It permits scanning discs to be cheaply produced with the utmost accuracy.

In order to properly associate and support the marked discs, especially if they are made of such material as glass, a hub member, or wheel 40 may be provided as shown in assembly in Figs. 4 and 5, the latter being in section along plane 5—5 of the former. This disc wheel is of material, such as metal, which has relatively great mechanical strength. It is arranged for mounting on a shaft 41 and its disc portion is drilled with a series of holes 42 in alignment with and very much larger than the optical apertures 123 formed by combining the plates 10 and 20 or 10 and 30. The aperture plates are preferably surrounded by a closely fitting circumferential ring to take up centrifugal strain and are clamped to the wheel 40 by any suitable means such as is shown more clearly in the section drawing Fig. 5. The two ruled plates may be cemented together before being mounted and this is particularly desirable if the mounting device is limited to a center hub support. The plates when assembled should be sealed to prevent moisture or other foreign matter entering and lodging between them. The field of view is indicated by 120.

The aperture plates described above are shown in the drawing as discs with a comparatively small hole through their center and, if they are made of material which will stand the stresses of rotation, they may be directly clamped in a hub upon a shaft without using the disc and outer rim portion of the wheel 40. However, with the mounting wheel 40 arranged to grip their periphery, the center of the apertured plates may be cut away to such an extent that these plates are rings having a radial depth only somewhat greater than the radial depth of the positions of the optical apertures.

An alternative arrangement for obtaining optical apertures in substantially rectangular shape and with the precision already described comprises a single light transmitting disc, as thin as is permissible under the strains of rotation, and coated on the two opposite faces with an opaque film through which is formed light transmitting lines as shown in Figs. 1 and 2, respectively, or as is shown in Figs. 1 and 3, respectively, on the two faces. Figs. 6 and 7 are broken face and cross-sectional views of a fragment of such a scanning disc forming a unitary structure. The transparent disc 50 should be made as thin as practicable so that the two opaque coatings 51 and 61 will lie as nearly in the same plane as possible. This type of disc is preferably used in a manner described below. The circularly positioned markings 62 are formed in the coating 61 and the radially positioned markings 52 are formed in the coating 51. The coating 51 is shown removed from the left half of Fig. 6 so as clearly to show the marking 62. The right half shows a portion of the completed structure carrying a formed optical aperture 53. In this arrangement when the mechanical process of engraving is employed the two engraved faces are preferably protected with a coating of transparent lacquer or by cover glasses on the two sides. While this arrangement with the cover glasses is more cumbersome and does not have all the advantages of the one employing two separately formed or engraved discs with their coated faces adjoined, it does permit employing the same process in the forming and positioning of the optical apertures, and with a satisfactory outside protective varnish the arrangement is simpler and cheaper. In using the single disc doubly coated on its opposite faces it should be kept as thin as possible, as stated above, and the distance of observation should be such that both front and back surfaces are practically in simultaneous focus. If used with a magnifying system at a short observing distance so that only one surface can be accurately in focus this surface should be the one with the circular or spiral markings in order to secure accurate juxtaposition of the image scanning strips. The fuzzing of the sides formed by the radial markings will cause some loss of definition in the direction along the image strips which may demand that these radial markings be made narrower and therefore less efficient in transmitting light than if they were sharply defined.

Figs. 1, 2 and 3 show radial and circular markings of uniform width such as can be made with an engraving tool of a given width. As already indicated the sides of the aperture may be radial, as shown in Fig. 8, and more than one cutting of the engraving tool may be employed for a marking.

For a scanning disc the ideal form of aperture would be one in which two sides are radial and two sides circular. This would require in the mechanical process two operations of the engraving tool in making the radial markings. A method by which the engraving operations for such an aperture can be performed is diagrammatically shown in Fig. 8. The engraving tool is somewhat narrower than the width of the aperture markings. It is first radially operated to engrave between lines 1 and 1' and next to overlappingly engrave between lines 2 and 2'. The radial length of the engravings may be comparatively short as here shown or somewhat longer than the radial width of the spiral as explained in describing Fig. 1. The circumferential engraving is between the circular lines 3 and 3'. The resulting optical aperture A, B, C, D has radial boundaries on two of its opposite sides and circular boundaries on the other two opposite sides.

A close approximation of such a shaped aperture is formed by combining the discs shown in Figs. 1 and 2 and Figs. 1 and 3. The resulting optical apertures are each bounded by two opposite circular sides and the other two sides are parallel lines making equal angles with the radius passing through the center of the aperture. All engraving markings here have parallel sides. As a further modification the apertures may be quadrilateral in the form of squares or rectangles with straight sides. This is shown in Fig. 9. The radial marking is bounded by lines 1 and 1' which are parallel to each other and make equal angles with the radius passing through the center of the aperture. The circular or spiral markings may not be engraved as such but as a series of short straight lines. Such engravings are between parallel lines 4 and 4' and are made in a straight line normal to the radius of the scanning disc passing through the center of the aperture. The resulting optical aperture A, B, C, D is square or rectangular. It may be made trapezoidal by employing two radial engravings as described for Fig. 8 and other shapes may obviously be formed by this method.

The ideal method for engraving the circular or spiral marking, and for other markings where the opposite sides are parallel, consists in the use of a single cutting tool which is ground to exactly the right width. An alternative scheme is shown in Figs. 10 and 11. In Fig. 10 two successive overlapping cuts are made with a tool narrower than the final width of the marking. The tool is moved between cuttings by a sufficient amount so that the extreme outer edges are at the required distance apart. The two positions of the tool are betwen lines 1 and 1' and lines 2 and 2', respectively. Fig. 11 shows a modification of this. Two separated narrow bounding cuts between lines 1 and 1' and between lines 2 and 2' are first made at each edge of the final marking, and, by means of a third and wider tool cutting between lines 3 and 3', the coating between the first two markings is removed. From this it is seen that different sizes and shapes of optical apertures may be obtained by various methods of making the engravings.

Figs. 12 and 13 are broken face and cross-sectional views of a fragment of a scanning disc of unitary structure employing a single transparent supporting member and two ruled or marked coatings both superimposed thereon on one side of the transparent member. In this further alternative arrangement, the light transmitting line rulings or markings in the associated film coatings are, of course, the same as shown in Figs. 1 and 2, respectively, or as shown in Figs. 1 and 3, respectively, or modifications thereof. The transparent supporting member 70 carries an opaque ruled coating 71 having circumferential or longitudinal transparent lines 72. A second opaque coating 73 having a plurality of spaced transparent radial or transverse lines 74 is superimposed upon the first coating 71 so that the transparent line rulings in each coating cross and form optical apertures 75. As stated in the more general description, the first of these coatings may be made by the engraving process and the second by the photographic process, or both may be made by the photographic process. When the double photographic process is used, a waterproof transparent varnish is preferably used between the first photographic print and the second photographic emulsion coating. With the photographic process or combination of it with the mechanical engraving process, the two ruled or marked coatings are preferably superimposed upon each other on one side of the transparent supporting member thus positioning the optical apertures in practically one plane substantially the same as is obtained when two separately coated discs are fixed together with the coated surfaces adjacent.

Fig. 14 is a cross-sectional view in side elevation of a composite construction in which support discs with individual coated and optically marked transparent inserts are fixed in each aperture position. This arrangement affords a stronger and safer construction than is obtainable with the glass disc or ring arrangement and it also permits the formation of the optical apertures in accordance with different methods described herein. This arrangement comprises a metal support wheel or disc member 81 of material having considerable mechanical strength, such as metal, mounted on shaft 41 and equipped at each aperture position with a transparent insert 82 optically marked in accordance with the methods described herein to cooperate in defining the optical scanning apertures. Either a single or a double disc member may be used depending upon whether one or two elements are employed in carrying the opaque material used to define the optical apertures. In the drawing a second metal support disc 83, also mounted in the shaft 41 and equipped at each aperture position with a transparent insert 84 is clamped against the first support disc with the coated face of the inserts of one disc adjacent to those of the other, thus forming a scanning member of the double disc type. The inserts are cemented or otherwise fastened in the metal support members and are small transparent discs preferably of the same thickness as the support members in which they are mounted.

The several arrangements described herein have different commercial advantages and in quantity manufacture the methods and combinations best suited to economical production would naturally be employed. Irrespective of the kind of and the method of processing the opaque coating or film applied to the transparent supporting members or inserts, the patterns of the transparent rulings or markings in the coatings are obviously geometrically the same, and the complete composite unitary scanning member can be constructed with coatings formed and marked by either similar or different processes as heretofore mentioned. Geometric accuracy in the mechanical process necessitates precision operation of the engraving engine in the construction of each disc, while the chemical process employing photographic copying requires precision operation in the making of master forms or negatives from which duplicate prints are repeatedly photographically made of the proper density. It is relatively cheaper to engrave a circumferentially or spirally positioned line ruling or marking than the radially positioned markings or rulings. This is true because the curved, or spiral rulings can be accurately and quickly made by a continuously feeding tool, while the successively spaced rulings require a comparatively lengthy operation by the engraving process. In view of this, where only one of the coatings is engraved that one having the circumferential rulings is preferably so made and the other having the radial or transverse markings is photographically formed. However, as already pointed out the master negative used in the photographic process is preferably initially formed by the engraving process or method so as to obtain a high degree of accuracy in the positioning and the definition of the lines.

While in the above description the advantage of the engraving and the photographic processes in forming and accurately positioning quadrilateral shaped optical apertures so that they move in juxtapositioned paths has been set forth in accordance with certain aspects of this invention, scanning members may be formed by other means and in other shapes. It is, of course, within the scope of the invention to construct the scanning member in the form of a drum or belt having optical apertures formed and positioned by properly positioning transparent crossed lines in opaque coatings. Where it is desired to have the scanning paths overlap four sided diamond shaped apertures may be formed by superimposing two ruled opaque films with their transparent lines crossing obliquely, or other polyhedral shaped apertures may be formed by successively superimposing or juxtapositioning three or more ruled opaque films with their transparent lines crossing in different directions with respect to each other. Various modifications and uses of this invention will be obvious to those skilled in the art.

This application is a continuation of application Serial No. 672,576, filed May 24, 1933.

What is claimed is:

1. Scanning apparatus comprising a light opaque film through which is engraved line areas for transmitting light, a second light opaque film through which is engraved line areas for transmitting light differently arranged than those of the said first film, and transparent means for supporting and relating the said two films in such relative position with respect to each other that their respective light transmitting line areas cross and remain crossed in fixed relation to each other.

2. A scanning device comprising two thin light opaque members each having light transmitting line areas, the said line areas being so patterned in each of said members that upon superimposing the members in fixed relationship the respective line areas cross and jointly define a plurality of optical apertures in a desired arrangement, and rigid light transparent means aligned with, and extending beyond the boundaries of, each of said apertures and supporting and positioning said members all in a unitary scanning structure.

3. Scanning apparatus comprising a member having light transmitting line areas and a second member having light transmitting line areas differently arranged than those of the first mentioned member, and rigid light transparent means aligned with, and extending beyond the boundaries of, each of said line areas for supporting and relating the said two members in such relative position with respect to each other that their respective transmitting line areas cross and remain crossed in fixed relation to each other.

4. Scanning apparatus comprising a member having light transmitting line areas and a second member having light transmitting line areas differently arranged than those of the first mentioned member, means for relating the two members in such position that their respective transmitting line areas cross, and rigid light transparent means aligned with, and extending beyond the boundaries of, each of said line areas for moving the said members without relative motion with respect to each other.

5. Scanning apparatus comprising a disc having uniformly spaced radial line areas transmitting light and the space between said lines opaque, a second disc having circular light transmitting line areas and the space outside of each of said line areas opaque, each of said discs being without physical openings at said line areas, and means for holding the said discs in fixed relation to each other on a common axis.

6. Scanning apparatus comprising a disc having uniformly spaced radial line areas transmitting light and the space between said lines opaque, a second disc having curved light transmitting line areas and the area adjoining said line areas opaque, each of said discs being without physical openings at said line areas, and means for holding said discs in fixed relation to each other on a common axis.

7. Scanning apparatus comprising a disc having uniformly spaced radial line areas transmitting light, and a second disc having tangential line areas transmitting light and so positioned that each tangential line area is normal to a radial line having an angular spacing equal to that of the radial line areas of said first mentioned disc and said tangential line areas being so positioned radially that the inner edge of one tangential line area is exactly tangent to the outer edge of a succeeding tangential line area, each of said discs being without physical openings at said line areas, and means for holding the said discs in fixed relation to each other on a common axis.

8. As an article of manufacture, a scanning disc built up of two flat round glass plates into a unitary structure, each of said plates being covered with a thin coating of opaque material, one of them being engraved with radial lines to remove strips of said material and the other with a curved line or lines depending upon the type of scanning that is required, and means for mounting the two plates face to face with the opaque surfaces adjoining each other in such a manner that the said engraved lines of the two plates cross each other thereby forming substantially rectangular arcuately arranged optical apertures in the said built-up disc.

9. Scanning apparatus comprising a plate member composed of light transmitting material and an opaque film coating on one side thereof through which are cut line strips permitting the passage of light, a second member similarly constructed, means for uniting the two members in such relative position that their respective light transmitting line strips cross and hold their respective opaque film faces in close contact with each other, and means for sealing the two members together and for preventing foreign material entering between the said members.

10. The method of forming a scanning member having optical apertures substantially without thickness which consists in coating a transparent member with a thin layer of opaque material and engraving lines therethrough, coating a second transparent member with a thin layer of opaque material and engraving lines therethrough in a pattern different from that of the first mentioned member, placing said transparent members substantially against each other with their opaque coating materials adjacent and therebetween in such manner that the engraved lines on the two transparent members cross each other and at their crossings form optical apertures.

11. A scanning member comprising light transmitting material in the form of a thin plate rotatable about an axis perpendicular thereto, an opaque film affixed to one side of said plate and having radial lines with respect to said axis engraved therethrough, a second opaque film also affixed to one side of said plate and having lines tangential to a predetermined curve engraved therethrough so positioned that they cross the said radial lines engraved through the first mentioned opaque film thereby permitting the passage of light at points where the lines of the two films cross thus forming optical apertures.

12. As an article of manufacture, a scanning device comprising two members of transparent material, means for holding said members in fixed relation to each other with a surface of one parallel to and spaced a slight distance from a surface of the other and opaque material filling the space between said members except for small regions constituting optical apertures, whereby said apertures are entirely enclosed and thus made dust-proof, said opaque material comprising two thin layers in contact with said surfaces, respectively, and each of said apertures being formed by a linear opening through one of said layers positioned to cross a linear opening extending in a different direction through the other of said layers.

13. A scanning device comprising a light transparent member, a thin member capable of obstructing the passage of light therethrough except for small substantially linear regions, a second thin member similar to the first mentioned thin member and having its linear regions similarly placed but differently oriented, and means for holding said members in surface contact with each other with a portion of each of said linear regions in said first thin member aligned with a portion of one of said linear region in said second thin member and at least one of said thin members in contact with a surface of said transparent member so that the latter has portions aligned respectively with said aligned portions of said regions of said thin members.

14. A scanning member of unitary construction comprising a single support element of light transparent material carrying a film coating allowing the passage of light therethrough at given line areas and obstructing the passage of light between said line areas and also carrying a superimposed second film coating allowing the passage of light therethrough at given line areas and obstructing the passage of light between said line areas, the pattern of the line areas in the said coatings being so designed and positioned as to cross and form optical apertures at their crossing points in a predetermined arrangement.

15. A scanning member of unitary construction comprising a support element of light transparent material carrying a plurality of film coatings each allowing the passage of light therethrough at given line areas and obstructing the passage of light between said line areas, the line areas in the said coatings being so designed and positioned as to cross and form optical apertures at their crossing points in a predetermined arrangement.

16. Scanning apparatus comprising a light opaque film in which is photographically formed light transmitting line areas, a second light opaque film in which is formed light transmitting line areas differently arranged than those of the said first film, and continuous transparent means for supporting and relating the said films in such relative positions with respect to each other that their respective light transmitting line areas cross and remain crossed in fixed relation to each other.

17. Scanning apparatus comprising a support element of light transparent material carrying an opaque coating having light transmitting mechanically engraved line areas following a curved path, and a second opaque coating having light transmitting photographically formed line areas substantially radially positioned and superimposed on said first mentioned coating with the transparent line areas in the said coatings crossing and at such points forming optical apertures.

18. A scanning member of unitary construction comprising a support element of relatively strong material, a plurality of inserts of light transparent material fixed in said support element at each aperture position therein and carrying film coatings, each coating allowing the passage of light therethrough at given line areas and obstructing the passage of light between said line areas, the line areas in the said coatings at each aperture position being so positioned as to cross and form optical apertures at their crossing points.

19. Scanning apparatus comprising a support member supporting light transparent inserts located in the aperture positions and having a film coating covering one side of each of said inserts transmitting light therethrough at given line areas and obstructing transmission between said line areas, and a second member similar to said first member positioned adjacent thereto in such relative position that the said light transmitting line areas of associated inserts cross and form optical apertures at their crossings.

20. A scanning device comprising light transparent material continuous in the direction of light transmission during use, thin opaque members carried by said transparent material, linear apertures in said opaque members, and means to maintain said light transparent material and said opaque members in fixed relative relationship with certain of the apertures crossed to form a desired scanning pattern by the crossed arrangement of said apertures.

HERBERT E. IVES.